March 31, 1964 P. E. BARNES ET AL 3,126,980
SELF-CONTAINED LUBRICATION SYSTEM
Filed Feb. 18, 1963 2 Sheets-Sheet 1

INVENTORS
PHILIP E. BARNES
NORMAN B. NEWTON
BY Norman Friedland
AGENT

March 31, 1964　　P. E. BARNES ET AL　　3,126,980
SELF-CONTAINED LUBRICATION SYSTEM

Filed Feb. 18, 1963　　　　　　　　　　　　2 Sheets-Sheet 2

INVENTORS
PHILIP E. BARNES
NORMAN B. NEWTON
BY *Norman Friedland*
AGENT

United States Patent Office 3,126,980
Patented Mar. 31, 1964

3,126,980
SELF-CONTAINED LUBRICATION SYSTEM
Philip E. Barnes, North Granby, and Norman B. Newton, South Glastonbury, Conn., assignors to United Aircraft Corporation, East Hartford, Conn., a corporation of Delaware
Filed Feb. 18, 1963, Ser. No. 259,306
5 Claims. (Cl. 184—6)

This invention relates to lubrication systems and particularly to a self-contained lubrication system adapted for use in gear boxes and the like.

It is a feature of this invention to utilize existing hardware in a gear box for pressurizing lubricant for distribution to various parts in the gear box.

Another feature of this invention is to utilize a gear in the gear box for pressurizing and distributing lubricant to a network of nonrotating fluid conducting passages.

A still further feature of this invention is to provide in a system as described the combination of a self-contained lubrication system and pumping means for scavenging the gear box.

A still further feature of this invention is to mount the lubricant reservoir in such a manner that the rotating mechanism becomes flooded with lubricant so that the rotating mechanism serves as a splash-type of lubrication system in the event of a malfunction of the normal lubricating system.

A still further feature of this invention is to utilize the existing mechanism in a gear box in order to obtain a reduction in cost and a reduction in weight without sacrificing reliability, notwithstanding the fact that this system is subjected to rugged use.

Other features and advantages will become apparent from the specification and claims and from the accompanying drawings which illustrate an embodiment of the invention.

Figure 1:
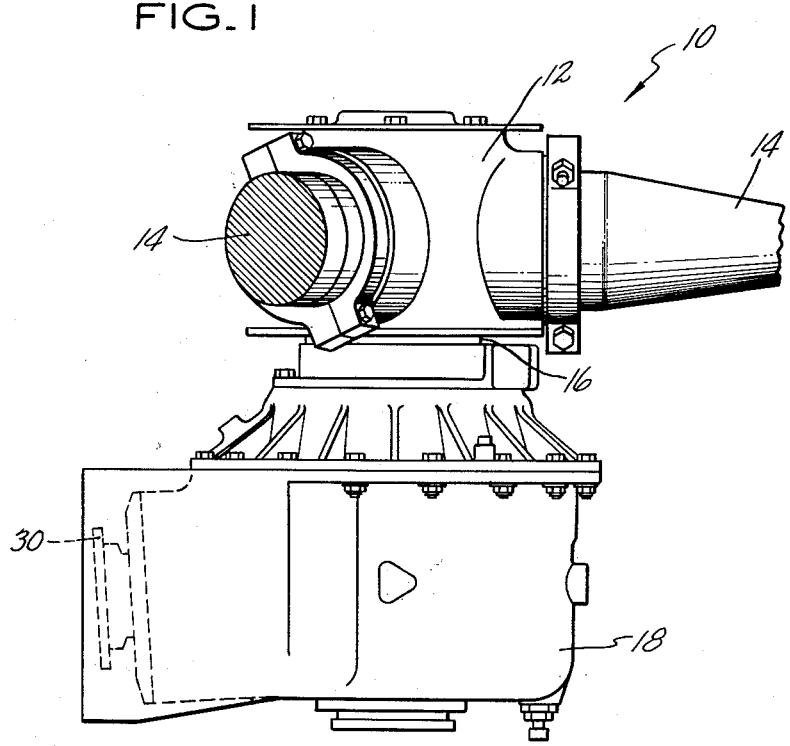
FIG. 1 is an elevated side view of the gear box connected to a variable pitch propeller.
Figure 2:
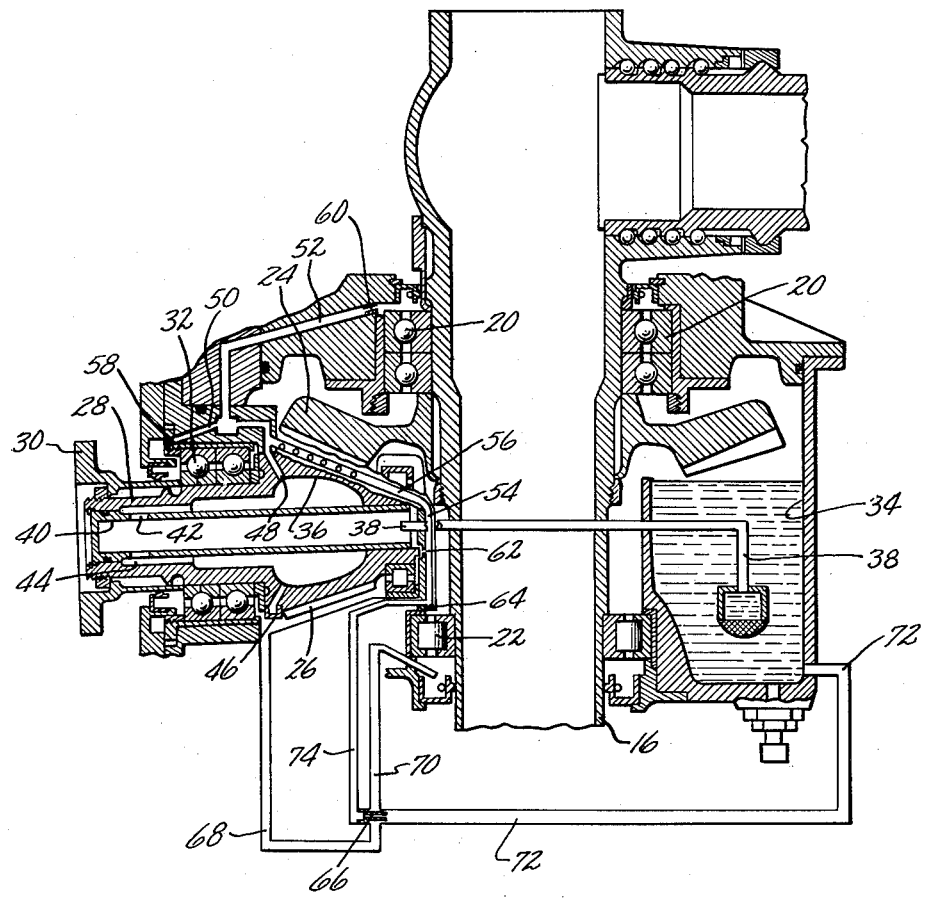
FIG. 2 is a schematic showing of the self-contained lubrication system, together with a sectional showing of the gears and its attendant driving mechanism.

Now referring more particularly to FIGS. 1 and 2 which generally shown an aeronautical propeller generally indicated by numeral 10 having a hub 12 rotatably supporting a plurality of variable pitch propeller blades 14. The propeller is suitably driven by elongated hollow shaft 16 which extends through the gear box 18. As shown in FIG. 2, hollow shaft 16 is rotatably supported by bearings 20 and 22. Mounted on shaft 16 is bevel gear 24 which engages pinion gear 26. Elongated hollow shaft 28 is integrally connected to pinion gear 26, which shaft extends axially along the axis of rotation and suitably engages flange 30. Flange 30 may be suitably connected to a driving mechanism and eventually connects to a propulsion device for being driven thereby (not shown). Pinion gear 26 and its shaft are rotatably supported to the gear box by suitable bearings 32.

It is therefore apparent from the foregoing that flange 30 when rotated drives pinion gear 26 which in turn drives bevel gear 24 for rotating the variable pitch propeller assembly. In accordance with the present invention a suitable self-contained lubrication system is provided, which system utilizies the rotational movement of the pinion gear 26 for increasing the pressure of the lubricant for delivering the same to the various parts of the gear box intended to be lubricated. As noted from FIG. 2, the lubricant reservoir 34 is formed in the gear box and is connected to a cavity portion 36 formed on the inner diameter of pinion gear 26 by fluid connecting line 38, tube 40, drill passage 42 and annular passage 44. Owing to the rotational movement of the pinion gear, the fluid in cavity 36 is centrifugally pressurized for conducting lubricant to various parts in the system which are intended to be lubricated. It will be appreciated that this arrangement directs the fluid to an extreme end, which end is the coolest portion of the system since it is the furthest away from the heat generating mechanism in order to subject the parts intended to be lubricated at the lowest temperature possible without providing additional cooling means. Inasmuch as the fluid must be transferred from a rotating part to a stationary part, a transfer bearing 46 is mounted adjacent to an integral outside diameter portion of pinion gear 26 and connects to the cavity portion through a plurality of drill passages 48. From the transfer bearing the network of passageways lead fluid from the transfer bearing to the various parts intended to be lubricated. By way of example, without inferring any limitations, such network includes passages 50 leading fluid to lubricate bearings 32, passage 52 leading lubricant to lubricate bearings 20, passage 54 leading lubricant to lubricate bearing 22, as well as the radial bearing supporting the pinion gear. It will be appreciated that passage 54 includes a spray bar portion 56 which lies adjacent to the bevel gearing and serves to lubricate the same.

Restrictors or orifices 58, 60, 62 and 64 are formed in the respective lubricant conducting lines 50, 52 and 56 intermediate the transfer bearing and the various parts of the gear box receiving the lubricant.

An important feature of this invention is to utilize the pressure generated by the pinion gear 26 for scavenging the gear box. This is accomplished by providing an ejector pump 66 and a network of scavenging lines 68 and 70 which communicate internally with the gear box and conduct fluid through lines 72 back to the reservoir 34. Ejector pump 66 works as a venturi-type of pump and conveys high pressure fluid issuing from transfer bearing 46 via lines 56 and 74. The high pressure fluid issuing from ejector pump 66 reduces the pressure in line 72 for drawing fluid out of the gear box and delivering it back to the lubricant reservoir.

Another important feature of the present invention is the utilization of the reservoir and network of scavenging lines and pinion gear 26 for obtaining a splash-type of lubrication system in the event of a malfunction of the normal lubrication system described above. This is accomplished by virtue of the fact that if a failure in the pumping occurs, fluid in reservoir 34 will be gravity fed through the various pumping scavenger lines into and around pinion gear 26. In essence, the gear box and its attendant mechanism become flooded with lubricant and owing to the rotational movement of gear 26, lubricant is splashed and lubricates the various rotating mechanisms in the gear box.

By virtue of the present invention the gear box and the attendant rotating mechanism are completely lubricated and cooled by the self-contained lubrication system, which system is characterized as being relatively economical, without substantially increasing the overall weight of the system. The invention provides an alternate lubrication system which serves to conduct lubricant to the various parts intended to be lubricated in the event of a malfunction of the other lubrication system.

It is to be understood that the invention is not limited to the specific embodiment herein illustrated and described, but may be used in other ways without departing from its spirit.

We claim:
1. A self-contained lubrication system for a gear box having a rotating gear, comprising a lubricant reservoir in the gear box, a cavity portion centrally formed in the inner diameter of said gear for receiving fluid and imparting a centrifugal force thereto when said gear is rotated, means including a hollow tubular member extending through said cavity portion and terminating at one end in said gear box for leading lubricant from said lubricant reservoir, said means defining a flow path for successively passing lubricant through said tubular member to an opening formed on one end of said tubular member to an annular passage surrounding said tubular member and to said cavity portion, a plurality of fixed connecting passages for leading lubricant from said cavity portion to portions of the gear box intended to be lubricated, transfer bearing means between said plurality of fixed connecting passages and said cavity portion, and means connected to said cavity portion for returning lubricant in said gear box back to said lubricant reservoir.

2. A self-contained lubrication system as claimed in claim 1 wherein said last mentioned means includes an ejector pump, a passage leading lubricant from said transfer bearing to said ejector pump and to said reservoir, and a plurality of scavenger lines in said gear box having one end terminating at the bottom thereof and the other end terminating adjacent said ejector pump.

3. A self-contained lubrication system as claimed in claim 1 including restriction means formed in each of said plurality of fixed connecting passages.

4. A self-contained lubrication system for a gear box having a rotating gear, a comprising lubricant reservoir in the gear box, a hollow elongated tube integrally mounted in said gear and extending along the axis of rotation, connection means communicating with a cavity portion formed internally of said gear for leading lubricant from said reservoir through said hollow elongated tube out of said tube and through an annular passage surrounding said tube, fixed connecting passages having fixed restrictions interconnecting said cavity portion and parts of said gear box intended to be lubricated, said gear serving as a pump for increasing the pressure of the lubricant, a transfer bearing mounted between said fixed connecting passages and said cavity portion for transferring lubricant from the cavity portion of said gear to said fixed connecting passages in combination with a scavenger system, said system comprising a plurality of scavenging lines and a high pressure line leading lubricant back to said reservoir, an ejector pump having a restriction disposed in said high pressure line comprising a passage leading fluid from said transfer bearing to said restriction, said lubricant reservoir being located such that the level of said lubricant is sufficiently high for allowing lubricant to back flow from the reservoir to the cavity portion when the pressure developed by said system drops below a predetermined value.

5. A lubrication system for an aeronautical propeller having propeller blades and a gear box comprising, in combination, a propeller shaft extending through said gear box, a first bevel gear in the gear box carried by said shaft, a second bevel gear mounted in said gear box adjacent to a peripheral surface of said propeller shaft and meshing with said first bevel gear, said gear box containing a lubricant reservoir located on an opposite peripheral surface of said propeller shaft, said system comprising connection means including an elongated tube for leading flud from said reservoir through said elongated tube through an opening formed on one end of said elongated tube, around said elongated tube and into a cavity portion formed in said second bevel gear, said elongated tube being closed at one end and extending from one end of said second bevel gear through said cavity portion and into said gear box, a plurality of fixed lubricant conducting passages each having a retstriction formed therein conducting lubricant from said cavity portion to portions of said gear box intended to be lubricated and a transfer bearing mounted between said cavity portion and said plurality of fixed lubricant conducting passages.

References Cited in the file of this patent

UNITED STATES PATENTS

| | | |
|---|---|---|
| 1,978,835 | Cotterman | Oct. 30, 1934 |
| 2,190,254 | Caproni | Feb. 13, 1940 |
| 3,006,439 | Molinaro | Oct. 31, 1961 |
| 3,065,822 | McAfee et al. | Nov. 27, 1962 |